UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., G. M. B. H., OF FRANKFORT-ON-THE-MAIN, GERMANY.

BORACIC-ACID ESTERS.

No. 841,738.      Specification of Letters Patent.      Patented Jan. 22, 1907.

Application filed May 31, 1906. Serial No. 319,564. (Specimens.)

*To all whom it may concern:*

Be it known that I, HEINRICH THRON, a subject of the German Emperor, and a resident of Frankfort-on-the-Main, Germany, have invented certain new and useful Improvements in Boracic-Acid Esters, of which the following is a specification.

Boracic acid is extensively used in therapeutics, and its salts are also frequently used; but the esters of boracic acid have not hitherto been employed, because they as hitherto prepared are mostly liquids which easily decompose and whose use presents difficulties. I have discovered that if brought in combination with terpene alcohols the boracic acid is converted into the form of solid crystallized esters, which are very stable in the dry state and which decompose readily when brought into contact with suitable substances. These esters are real chemical compounds and not merely mixtures, which is proved by the fact that they are able to be crystallized out of benzin or petroleum without altering their melting-point. They are also almost tasteless, contrary to their components. Furthermore, while boracic acid and menthol and boracic acid and borneol, respectively, are readily dissolved in alcohol the esters in question are not soluble in alcohol. The said esters constitute valuable medicines, especially as the said terpene alcohols, such as the menthol or the borneol components, are frequently required in medicine, and these become active in the nascent state when the esters are decomposed, the corrosive properties of menthol and of borneol and boracic acid being considerably mitigated in the esters. The said esters are produced by heating boracic acid and a terpene alcohol.

The mode of proceeding can be effected in various ways—for instance, as in the following examples, wherein the parts are by weight.

Example 1: 46.8 parts of menthol and 6.2 parts of boracic acid or 93.6 parts of menthol and seven parts of powdered anhydrous boracic acid or boracic anhydrid are heated (preferably to 140° centigrade) until the boracic acid is dissolved and water cannot be detected in the reaction mixture. The evaporation of the water may be accelerated by heating the upper part of the distilling apparatus in which the operation is carried out to a temperature preferably exceeding 100° centigrade. The reaction takes place according to the equations:

$$3C_{10}H_{20}O + B(OH)_3 = B(OC_{10}H_{19})_3 + 3H_2O,$$
$$6C_{10}H_{20}O + B_2O_3 = 2B(OC_{10}H_{19})_3 + 3H_2O, \text{ respectively.}$$

After a short time a clear liquid is obtained, which after being cooled down to 60° centigrade is mixed with about an equal quantity of alcohol. Fine crystals soon separate, which are dried by suction and washed with alcohols. After drying the menthol ester of boracic acid $B(OC_{10}H_{19})_3$ is obtained in the form of a crystalline powder which melts at 150° centigrade, is tasteless, and has a slight odor of menthol. It is composed as follows: B, 2.31 per cent.; C, 75.63 per cent.; H, 11.98 per cent.; O, 1.08 per cent.; total, one hundred per cent. This ester is difficultly soluble in water and alcohol, but is easily soluble in ether, benzin, and benzene. It soon decomposes into menthol and boracic acid when boiled with dilute acid, but more slowly when broiled with alkali. If the ethereal solution be mixed with a little acetic acid, the compound is rapidly decomposed into its components.

Example 2: 46.8 parts of menthol and 18.8 parts of boroacetic anhydrid, or preferably a small excess of menthol, are heated to 150° centigrade until no more acetic acid distils off. The reaction takes place according to the equation:

$$3C_{10}H_{20}O + B(O.CO.CH_3)_3 = B(O.C_{10}H_{19})_3 + 3CH_3COOH.$$

If the clear solution thus obtained be allowed to cool down to 60° centigrade while it is being stirred, a pulp of crystals is formed which is triturated with alcohol, dried by suction, and washed with alcohol. The ester may also be conveniently prepared by heating *in vacuo*.

Example 3: 23.1 parts of borneol, 3.1 parts of boracic acid, and eighty parts of xylene are heated so as to gently boil until aqueous vapor ceases to be given off. The reaction takes place as follows:

$$3C_{10}H_{11}O + B(OH)_3 = B(O.C_{10}H_{17})_3 + 3H_2O.$$

The xylene is then distilled off by boiling the reaction mixture to 250° centigrade. The residue, which solidifies on cooling, is finely triturated and boiled with methyl alcohol, in which the borneol ester of boracic acid is almost insoluble. After washing out and drying the ester forms a white tasteless powder with a slight odor of borneol. Its composition is $B(OC_{10}H_{17})_3$. Its percentage composition is: B, 2.34 per cent.; C, 76.60 per cent.: H, 10.85 per cent.; O, 10.21 per cent.; total, one hundred per cent. In benzin and benzene and ether it readily dissolves; but it is almost insoluble in ethyl and methyl alcohols. If allowed to remain long in these alcohols, the ester decomposes.

Example 4: 92.4 parts of borneol, 7.0 parts of finely-pulverized boracic anhydrid, and two hundred parts of xylene are boiled until the anhydrid is fully dissolved and no more water passes over in the form of vapor. The reaction takes place as follows:

$$6C_{10}H_{18}O + B_2O_3 = 2B(O.C_{10}H_{17})_3 + 3H_2O.$$

The remainder of the operation is the same as explained in Example 3.

Example 5: 46.2 parts of borneol and 18.8 parts of boroacetic-anhydrid are fused and the melt heated to 250° centigrade, the liberated acetic acid completely distilling over. The reaction takes place as follows:

$$3C_{10}H_{18}O + B(O.COCH_3)_3 = B(OC_{10}H_{17})_3 + 3CH_3.COOH.$$

The fused residue is further heated, as explained in Example 3.

I claim—

1. The herein-described method of manufacturing boracic-acid esters in the form of a dry crystalline powder by heating a mixture of boracic acid and a terpene alcohol substantially as and for the purpose described.

2. The herein-described method of manufacturing boracic-acid esters in the form of a dry crystalline powder by heating a mixture of boracic acid and menthol substantially as and for the purpose described.

3. As an article of manufacture boracic-acid ester of terpene alcohols having the properties of being in the form of dry crystalline powders which are tasteless, soluble with difficulty in alcohol but readily soluble in benzene and in benzin and in ether substantially as described.

4. As an article of manufacture a boracic-acid menthol ester having the properties of being in the form of a dry crystalline powder which has a slight odor of menthol, is tasteless, soluble with difficulty in alcohol, but readily soluble in benzene and in benzin and in ether, and decomposes into menthol and boracic acid when boiled with dilute acid or alkali substantially as set forth.

In testimony whereof I have signed my name to this specification in the presence of two subscribing witnesses.

HEINRICH THRON.

Witnesses:
JEAN GRUND,
CARL GRUND.